United States Patent [19]
Beltz et al.

[11] 3,862,298
[45] Jan. 21, 1975

[54] PROCESS FOR THE TREATMENT OF A SALT-CONTAINING ACID SOLUTION

[75] Inventors: Klaus Beltz, Budenheim (Rhine); Klaus Frankenfeld, Hunfelden-Kirberg, Taunus; Karl Götzmann, Budenheim (Rhine), all of Germany

[73] Assignee: Chemische Fabrik Budenheim Rudolf A. Oetker, Germany

[22] Filed: Aug. 22, 1972

[21] Appl. No.: 282,752

[30] Foreign Application Priority Data
Nov. 22, 1971 Germany............................ 2157738

[52] U.S. Cl.................. 423/659, 423/321, 423/522
[51] Int. Cl....................... C01b 25/16, C01b 17/72
[58] Field of Search ........... 423/659, 557, 305, 420, 423/522, 317, 321

[56] References Cited
UNITED STATES PATENTS
3,463,609  8/1969  Garris.................................. 423/320
3,684,438  8/1972  Gleason ............................. 423/321

FOREIGN PATENTS OR APPLICATIONS
173,727  12/1934  Switzerland......................... 423/321

*Primary Examiner*—Oscar R. Vertiz
*Assistant Examiner*—Gregory A. Heller
*Attorney, Agent, or Firm*—Marn & Jangarathis

[57] ABSTRACT

A process for treating a salt-containing acid solution is described wherein the cations contained therein are effectively removed by contacting such solution with an organic solvent to precipitate a cation-containing solids fraction. The organic solvent is miscible with water and acid in all proportions. The solids fraction is separated, for example by filtration techniques, and after further treatment may be used in other processing operations. The liquid phase is treated to remove the organic solvent thereby leaving an acid solution which may be used, inter alia, for the regeneration of a cation exchange resin.

10 Claims, No Drawings

PROCESS FOR THE TREATMENT OF A SALT-CONTAINING ACID SOLUTION

BACKGROUND OF THE INVENTION

This invention relates to the treatment of salt-containing acid solutions, and more particularly to the treatment of a salt-containing acid solution obtained by the regeneration of a cation exchange resin.

In recent years, ion-exchange processes have met with ever increasing utilizations. Such ion-exchange processes are employed in normal operations as well as in the solving of special problems in liquid waste disposal technology wherein cation or anion exchangers, or a combination thereof are employed.

When the capacity of an ion-exchange resin is exhausted, i.e., when all active groups of the exchange resin are occupied by the ions exchanged, the resin must be freed of the bound ions and brought back to its original condition by regeneration. In the case of cation exchange resins, regeneration is generally effected with strong acids.

Strongly acidic cation exchange resins, generally formed from polystyrol-divinylbenzol with active $SO_3H-$ groups, are usually regenerated with hydrochloric acid or sulfuric acid, whereby (according to manufacturer's specification) about 160 gms. of HCL(100%) or 240 gms. of $H_2SO_4$(100%) per liter of resin is required. The regenerating acid is normally used in diluted form, e.g. in 5 to 10% aqueous solutions. By this method of operating a useful volume capacity establishes itself in continuous operation in the resin bed amounting to about 1.2 to 1.35 gram equivalents per liter of resin. From such consumption rates, it follows that for regeneration of a strongly acidic cation exchange resin about 4.4 to 4.9 gram equivalents of a strong acid must be used per liter of resin, in order that 1.2 to 1.35 gram equivalents of bound cations can be removed from the resin.

The effluent from the regeneration of a resin obtained by this means is a greatly diluted aqueous solution containing about 1.2 to 1.35 gram equivalents of salt together with 3.2 to 3.6 gram equivalents of free acid and is a strongly acidic liquid and cannot, therefore, be discarded without neutralization of excess acid. If heavy toxic metal ions are bound to the cation exchange resin, the effluent from regeneration must not only be neutralized but also must be freed of such heavy metal ions by detoxification and filtration procedures before discarding. Precipitated metallic hydroxide sludges must be set aside under special storage conditions to prevent pollution of the environment, particularly surface waters.

The cost of regeneration, neutralization and, as the case, may be, detoxification are thus cost-determining factors for every ion-exchange process. Apart from economic consideration, which in most cases for use of an ion-exchange installation on an industrial scale are of decisive importance, there is the necessity to consider the potential pollution of the environment posed by the necessarily great excess of regenerative media. Today, ion-exchange installations are often established for the pre-treatment of waste waters making it possible to completely satisfy the need for environmental protection and to keep the waters free from heavy toxic metal ions.

OBJECTS OF THE INVENTION

An object of this invention is to provide an improved process for treating salt-containing acid solutions.

Another object of this invention is to provide an improved process for treating salt-containing acid solutions whereby heavy metal ions contained therein may be readily removed.

A further object of this invention is to provide an improved process for treating salt-containing acid solutions whereby the acid values thereof may be recovered.

Still another object of this invention is to provide an improved process for treating salt-containing acid solutions which reduce environmental contamination.

A still further object of this invention is to provide an improved process for treating salt-containing acid solutions obtained from the regeneration of a cation exchange resin in a manner more efficacious than heretofore employed.

DETAILED DESCRIPTION OF THE INVENTION

Further objects and advantages of the invention will become apparent upon consideration of the detailed disclosure thereof. It has now been discovered that the salts can be removed from the effluent of a cation exchange regeneration and other salt-containing acid solutions. Accordingly, acids which are contaminated with salts are mixed with an organic solvent miscible with water and acids in all proportions with the resulting precipitated salt fraction being subsequently separated from the solvent containing acid solution. The solvent-and-acid-containing phase, after pre-treatment with a strongly acidic cation exchange resin, if desired, is separated by distillation with the acid and solvent streams being recovered and recycled. By means of the present invention, contamination of the environment from salting of waste outlets is minimized or prevented with a concomitant economic realization of many processes.

In the cation exchange process, neutralized acids no longer reach the outlet conduits, so that controversies with the sewage authorities are minimized and heavy metal ions are no longer stored for extended periods of time in vessels. Instead, the salt-containing acidic regeneration effluent and other salt-containing acid solutions are contacted in a sufficient amount in a pre-treatment installation including a mixer with an organic solvent, miscible in all proportions with water and acid added to the effluent in an amount from four to 10 times the amount of acid (basis-100% acid). Included as organic solvents, miscible with water and acid in all proportions, are the aliphatic alcohols, and ketones, such as methanol, ethanol, propanol, isopropanol, acetone etc., or their mixtures.

The salt-containing acid solutions are contacted with the organic solvent with agitation. The cations present in the acid separate out in the form of the salt, and a clean de-salting of the cations is achieved. Upon completion of the agitation, an interim zone is formed between the salt phase and the organic phase with the organic phase being lighter. The organic phase contains the entire acid excess not required to form the salt. Both phases are then separated from each other by filtration, decantation centrifugation or the like. If necessary, the separated salt fraction can be washed acid-free with fresh solvent and such wash solvent added either to the organic phase or saved for a subsequent treatment. The organic phase contains, along with the solvent and excess acid, a very small amount of dissolved salts as well, depending on the solubility product of the salt. The solvent may then be separated from the acid by distillation.

In ion-exchange processes, it may be undesired in certain instances to wash out the regenerated, but still acid-containing cation exchange bed with water. This is particularly so when the ion-exchange process is installed in an aqueous recirculation process. To be precise, washing out results in undesired water losses which are avoidable if the washing out of the regenerated but acid-containing cation exchange bed, is carried out with the requisite amount of organic solvent. Upon completion of the washing with solvent, the amount of solvent remaining in the exchanger bed is displaced with recirculating water. By this procedure, the organic solvent necessary for separating the salt fraction is not introduced directly, but rather is passed through the regenerated cation exchange bed into collecting tanks for the effluent of regeneration. If for specific reasons, the slight amount of residual salt content in the recovered acid is of concern, the residual salt content can be very readily removed from the acid-solvent mixture by passing it through a freshly regenerated cation exchange bed prior to evaporation.

According to the inventive process, sulfuric acid, phosphoric acids or mixtures thereof are acceptable, since they have a low vapor pressure and the organic solvent may be easily separated from said acids by evaporation. Formerly, phosphoric acid was not customarily used as regenerative acid, however, with the present invention phosphoric acid is quite suitable as a regenerative media, since it can be completely recovered forming no difficult soluble compounds in the strongly acidic range. The acidic alkaline-earth phosphates themselves are water soluble compounds. The phosphates are easily removed with the organic solvent from excess regenerative acid. The precipitated phosphates, in most instances, are highly valuable commercial by-products. If the cation exchange bed is loaded with a mixture of various cations, salt mixtures can also be obtained by regeneration and further processing according to the present invention. When phosphoric acid is used as regenerative acid, this mixture can be used in the fertilizer industry, and in many instances the precipitated phosphate mixture finds favorable sale as a trace element carrier. The regenerative effect of phosphoric acid, particularly with respect to trivalent cations, is not as good, for example as sulfuric acid. This shortcoming is avoided, however, if one fortifies the phosphoric acid to a slight extent with sulfuric to If the amount of sulfuric acid added with respect to phosphoric acid amounts to up to 5%, no danger exists that the gypsum will deposit on the resin surface during regeneration of an ion-exchange bed, partially or completely loaded with calcium ions.

In the further processing of the regenerative effluent according to the process of the present invention, a salt fraction is obtained which consists not only of cations, but also corresponds to the make-up of the regenerative acid, of a mixture of phosphate and sulphate anions. A small amount of sulphate is, however, of no significance when used, for example as a fertilizer additive. The choice of regenerative acids, i.e., sulfuric acid, phosphoric acid or the mixture thereof should be governed according to the type of cations bound and the consequent possibilities for further processing of the separated salts.

The inventive process is not only suitable for treating the effluent of a cation exchange regeneration, but is equally useful for the separation of salts from acids. Thus, acids mixed with salts of whatever origin can be treated into purer form, e.g. spent phosphoric acid, sulfuric acid liquor, or spent electro-polishing liquors. It is well enough known what technical difficulties and costs arise in the disposal of the aforementioned spent liquors. These liquors are relatively concentrated acids or acid mixtures. When they are used, a portion of the free acid is consumed by salt formation. The liquors lose their effectiveness when a relatively slight amount of salt forms in the liquor thereby requiring partial or complete regeneration.

For the disposal of the exhausted liquors, it was formerly diluted with water, if necessary, and neutralized with lye or milk of lime. The precipitated sludge was partially dehydrated and stored in suitable depositories with the aqueous salt solution being permitted to drain. This mode of operation is expensive, since the entire excess of acid is lost through neutralization, and still further costs arise in providing the neutralizing chemicals. On the other hand, the consistency of the neutralization sludges entails dehydration problems. The sludges thicken whether drainage beds or filter presses are used. When the resulting exhausted baths are treated according to the present invention, however, excess acid is recovered and the salts are easily separated, and pollution of the environment is avoided.

The resulting acid-salt mixture is stirred with four to 10 times the amount of an organic solvent miscible in all proportions with acid and water, as calculated with reference to 100% acid, and the precipitated salt fraction separated from the organic acid phase. The salt fraction is eventually washed with fresh solvent and passed to a suitable end use. The organic fraction is separated by distillation and the solvent recovered, either in pure form or, in cases in which it forms an azeotropic mixture with water, as an azeotropic mixture. The recovered acid is used as a make-up for losses in the liquor or for other end uses, for example, as a regenerative acid. According to the inventive process, both low percentage (10% acid content) and highly concentrated acids of up to 85% acid can be treated.

The inventive process constitutes a substantial advance relative to previously used methods. The process is extremely economical, since, for example in regenerations, the amount of acid consumed is necessary for salt formation with excess acid being recycled. The salts can be put to commercial use. In this manner, the expense of storage in vessels or other containers is eliminated. In this way, the result is achieved that in regeneration of a strongly acidic cation exchange resin, only the theortical amount of acid computed with respect to the required resin capacity is consumed. Since no acid lossess occur, the customary limitations for economic reasons as to amount and concentration of acid are eliminated so that one can regenerate with a larger amount of acid that is more highly concentrated and thereby improve the regenerative effect because a smaller residue charge remains. Thus, an increase in useful volume capacity of the exchange resin and a reduction in ion attrition is realized. The inventive process also has the advantage that the disposal of effluent from cation exchange regeneration does not cause salt and solid contamination of waste water, and thus avoids environmental problems. Also salt contaminated acids produced by other processes may be put to suitable end use according to the inventive process. Formerly, transformation or removal of such salt-containing acids by neutralization produced large amounts of water-containing sludges or highly concentrated salt solutions, the disposal and/or storage of which represented great problems, particularly sewage problems. The salts recovered by the instance process, in contrast, are poor in water and may be re-used as industrial raw materials.

EXAMPLES OF THE INVENTION

The following examples are illustrative of conditions for the process of the invention and it is to be understood that the scope of the invention is not to be limited thereby.

EXAMPLE 1

In a multi-stage gas washer, 10 cubic meters per hour of wash water were withdrawn containing about 0.1% ammonia (one-third present as ammonium carbonate), and smaller amounts of calcium, iron and magnesium ions. The wash water was passed through a strongly acidic cation exchange resin ($H^+$form) having a volume of 900 liters to remove the dissolved cations. To permit continuous operation, two ion-exchange columns were alternately placed in fluid communication.

When the binding capability of the cationic resin became exhausted, the alternate exchanger column (i.e., the regenerated column in standby mode) was placed in the fluid circuit and the regeneration cycle of the loaded exchange column was initiated. The water still present in the resin bed was displaced. A 40% phosphoric acid solution in an amount of 2.5 times (2,200 liters) the resin volume was introduced into the exchange column. The effluent from the exchange column was withdrawn and passed to a receiving vessel.

Because of the high acid concentration and great excess of acid, the acid solution was capable of use a second time as regenerative acid solution and thereafter as pre-regenerative acid solution prior to treatment. Upon completion of the treatment, the acid solution was displaced from the resin bed and the resin bed washed with isopropanol in an amount about 6.5 times resin volume. The solvent was thereafter displaced with a recirculating water stream. The wash liquid was passed to a receiving vessel. Since the regenerative acid was used repeatedly, the treating of the effluent in accordance with the present invention proceded after the second or third regenerative process. From the receiving vessel for the effluent of regeneration and wash liquid proportionate amounts of volume were admixed in a small tank with continuous stirring (vigorous agitation) and thereafter separated by filtration into a mother liquor (liquid phase) and precipitated salts. The precipitate was washed acid-free with isopropanol, dried and found useful as a component in a fertilizer composition. About 270 kilograms of the precipitate were recovered.

The liquid phase from the filtration step was collected and consisted of an approximately 13% alcoholic-phosphoric acid solution having about 0.03% ammonium ions (in accordance with the relevant solubility product). The liquid phase was thereafter passed through a regenerated (but not washed out) cation exchanger wherein all ions in the solvent were bound. The liquid phase, free of cations, was consequently separated by distillation into its components for recycling. The freshly regenerated exchange underwent a certain pre-loading by passing the liquid phase therethrough, but this-measured by the total capacity of the exchanger was insignificant. The further treatment of the regenerated exchange column proceded as previously described. 910 kilograms of phosphoric acid consisting of approximately 35% phosphoric acid was recovered and re-used as regenerative media.

EXAMPLE 2

A bunteloxal bath for the manufacture of colored aluminum structural parts having a volume of 22 cubic meters was prepared from organic acids. For consistency in coloration of the treated aluminum parts, along with the current density and composition of the bath, the proportion of dissolved aluminum ions in the electrolyte was of decisive importance and was maintained by the aid of a strongly acidic cation exchange resin ($H^+$form). In accordance with the surface area to be treated in the bath, a portion of the bath was passed through the cation exchange resin having a volume of 600 liters. For continuous operation, two exchange columns were available which were alternately placed on streams with the electrolyte.

After attaining loading equilibrium, the flow of electrolyte to the exchanger column was discontinued to permit regeneration thereof. Regeneration was carried out with 1.5 cubic meters of a 40% phosphoric acid-sulfuric acid mixture with the sulfuric acid content amounting to about 5% on the basis of phosphoric acid. The effluent from the regeneration was collected in a receiving vessel. Because of high acid concentration and the excess acid, the regeneration product could be used again as a pre-regenerative acid prior to treatment in accordance with the present invention. After passage of the regenerative acid solution, the exchange column was washed intensively with isopropanol in an amount of 8 times the resin volume and displaced from the exchange column. The wash liquid was collected in a receiving vessel.

For treatment of the effluent of regeneration, the effluent and wash liquid were thoroughly agitated in a mixing vessel. Flocculated aluminum salts were separated from the liquid phase by filtration and were subsequently washed with isopropanol and dried recovering 120 kilograms of aluminum phosphate which found use as a raw material in the glass industry.

The liquid phase was separated into its components by distillation. Post-treatment of the liquid phase with the aid of a cation exchange resin, as described in Example 1, was not necessary since aluminum salts have a very small solubility product. 710 kilograms of an acid solution consisting of an approximately 25% acid mixture were obtained and re-used as a regenerative media.

EXAMPLE 3

An iron etching liquor (20% phosphoric acid) having a volume of 25,000 liters was maintained at a temperature of 60° C and at an iron content of 30 grams iron per kilogram of liquor to achieve an optimal etching effect. The iron level in the liquor was maintained with a strongly acidic cation exchange resin ($H^+$form) by passing a portion of the liquor through an exchange column having a resin volume of 200 liters. The amount of the liquor treated was determined in accordance with the surface area subjected to the treatment. Two exchange columns were alternately operated to provide for continuous operation. After load equilibrium was attained in one resin bed, the stream of the etching liquor was passed through the second ion exchange column (regenerated).

A stream of air was first introduced into the exhausted resin bed to displace the corrosive acid present with regeneration being carried out with a 40% phosphoric acid solution. The quantity of regenerative media amounted to 2.5 times the resin volume, i.e., 500 liters. The effluent from regeneration was passed into a receiving vessel provided with a stirring mechanism. The freshly regenerated bed was washed with 2,600 kilograms of acetone and the wash liquid added to the effluent of regeneration with stirring. Acetone remaining in the resin bed was displaced by an etching acid.

The content of the receiving vessel was passed to a filter with the resulting filter cake being washed free of acid with acetone. The filtrate was dried and produced 26 kilograms of iron phosphate which were used as additives to varnishes. The liquid phase was separated in a distillation column into the solvent and free acid. About 235 kilograms of phosphoric acid (100%) were recovered in solution form having a concentration of about 35% phosphoric acid and a residual iron content of about 0.01 to 0.03%. The thus recovered phosphoric acid may be used either as fresh regenerative acid or as make-up acid as a result of attritional looses to the etching bath. The distilled solvent was employed for carrying out further regenerations.

EXAMPLE 4

An iron etching liquor (20% phosphoric acid) containing 60 grams of dissolved iron per kilogram of liquor with about 53% of the available phosphoric acid bound therewith was found to be ineffective. To regenerate the liquor, 600 kilograms of the liquor were agitated from time to time with 4,000 kilograms of isopropanol in a vessel provided with a mixing mechanism. The resulting mixture was passed to a filter to separate the filtrate from the mother liquor. The filter cake was washed with about 500 liters of isopropanol and dried. About 100 kilograms of iron phosphate was recovered per charge and was used as a component in a varnish. The mother liquor was passed to a distillation column wherein phosphoric acid was separated from the solvent. About 55 kilograms of phosphoric acid were recovered per charge at a concentration of about 150 grams of phosphoric acid per kilogram and a residual content of about 0.01 to 0.03%. The thus recovered phosphoric acid was returned to the etching bath, whereas the distilled solvent was employed for the further treatment of etching liquors.

EXAMPLE 5

An electropolishing bath for refined steel was prepared on the basis of a concentrated phosphoric/sulfuric acid solution. In operation, the bath became enriched with alloy constituents which go into solution as salts. Upon reaching a certain salt concentration, the electrolyte commenced to disperse and thereby lost its ability to perform on the metal surface. Such a bath is maintained in working condition by continuously removing a portion of the bath and replacing it with a commensurate amount of a new acid mixture.

A portion of the liquor (about 100 kilograms of the approximately 80% acid mixture) was withdrawn and contacted with agitation with 910 kilograms of azeotropic isopropanol. The resulting reaction mixture was passed to a filter to separate the precipitated metallic salt fraction which was washed with isopropanol and dried. The salt fraction had a weight of about 17 kilograms and consisted essentially of a mixture of iron, chromium and nickel phosphates and/or sulphates and was used as a fertilizer component. The isopropanol-acid solution was separated in a distillation column into its components with the recovered acid mixture having a concentration of about 77%. The recovered acid amounted to about 68 kilograms (calculated as 100% acid) and was used to compensate for bath losses.

EXAMPLE 6

An acid solution was to be treated consisting of about 70% phosphoric acid and about 1.5% sulfuric acid having the following cations present:
approximately 0.7% alkali and ammonium ions
approximately 1.0% calcium and alkaline earth ions
approximately 0.7% iron and aluminum ions The acid solution was intended to be introduced into another manufacturing operation. As a result of the high salt content, interference would result in the subsequent processing operation. Therefore, the salts were separated out of the acid mixture and a saltfree acid was recovered by the process of the present invention.

About 100 kilograms of the acid solution was passed to a vessel provided with a stirring mechanism and admixed with 410 kilograms isopropanol. The precipitated salt fraction was separated from the liquid phase by a filter, washed with the solvent and dried. The wash liquid was added to the acid-solvent mixture. In the liquid phase, there was still present a small amount of dissolved ions, particularly alkali and ammonium ions. The liquid base contained about 14% free acid with a residual salt content of about 0.04%. In order to remove such cations, the liquid phase was passed through a freshly regenerated cation exchange resin ($H^+$form) and subsequently separated by distillation into a solvent-free acid stream and a solvent stream. For each 100 kilograms of acid solution, 11 kilograms of dried salt fraction were recovered and used in the fertilizer industry. After distillation, about 89 kilograms of approximately 70% acid were obtained which was passed to the subsequent manufacturing operation.

EXAMPLE 7

From a copper wire bath, there was an hourly output of 2.5 cubic meters of a copper-containing waste liquid. In order to remove the copper ions, the waste liquid was passed through a strongly acidic cation exchange resin ($H^+$form) in an exchange column having a resin volume of about 500 liters. About 22.5 kilograms of copper ions were bound at the exhaustion point. Regeneration of the exhausted resin was effected with 1,000 liters of a 15% aqueous sulfuric acid solution. The effluent from regeneration was passed into a receiving vessel provided with an agitating device and was admixed with 1,650 kilograms of ethanol. The resulting precipitated salt was separated from the acid-alcohol mixture by filtration, washed with ethanol and dried recovering about 57 kilograms of copper sulphate. The acid-alcohol mixture was separated by distillation with about 130 kilograms of acid having a concentration of 13% being recovered for use in preparing a 15% regenerative acid solution. The alcohol was recycled for precipitating copper sulphate.

While the invention has been described in connection with several exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed:

1. A process for treating a cation-containing acid solution, said acid solution being selected from the group consisting of sulfuric acid, phosphoric acid and mixtures thereof and constituting an effluent recovered by the regeneration of a cation exchange resin, which comprises:
    a. admixing said acid solution with an organic solvent miscible in all proportions with water and acid wherein the amount of said organic acid admixed being from four to 10 times the amount of acid (calculated as 100% acid) to form thereby a solid fraction containing said cation;
    b. separating said solid fraction from the resulting liquid phase; and
    c. separating said organic solvent from said liquid phase.

2. The process as defined in claim 1 wherein separation of said solid fraction is effected by filtration.

3. The process as defined in claim 1 wherein said organic solvent is separated from said liquid phase by distillation.

4. The process as defined in claim 1 wherein said acid solution has a concentration of from 10 to 85 percent.

5. The process as defined in claim 1 wherein said organic solvent is an aliphatic alcohol.

6. The process as defined in claim 1 wherein said organic solvent is an azeotropic organic solution.

7. The process as defined in claim 1 wherein the organic solvent is passed through a acid regenerated cation exchange resin prior to step (a).

8. The process as defined in claim 1 wherein step (a) is effected with vigorous agitation.

9. The process as defined in claim 1 wherein said liquid phase of step (b) is passed through a cation exchange resin prior to step (c).

10. The process as defined in claim 1 wherein the organic solvent of step (c) is recycled to step (a).

* * * * *